United States Patent Office 3,539,864
Patented Nov. 10, 1970

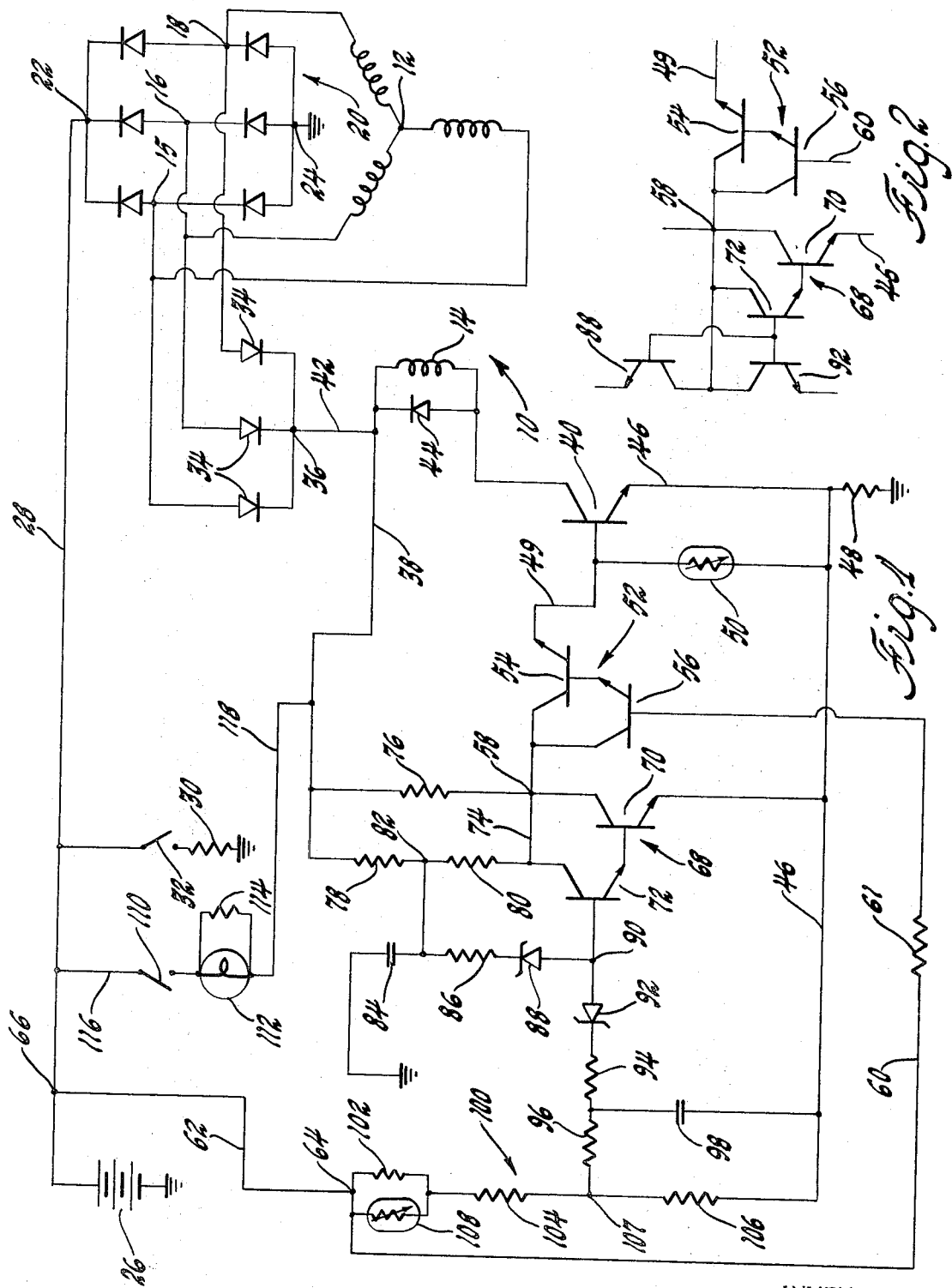

3,539,864
VOLTAGE PROTECTION OF GENERATOR REGULATING SYSTEMS
Glen E. Harland, Jr., and Charles G. Hanson, Kokomo, Ind., assignors to General Motors Corporation, Detroit, Mich., a corporation of Delaware
Filed Oct. 23, 1968, Ser. No. 770,047
Int. Cl. H02h 7/06; H02p 9/30
U.S. Cl. 317—13                     10 Claims

ABSTRACT OF THE DISCLOSURE

This invention relates to a protection system for generator regulating systems utilizing a transistor voltage regulator. The regulator of this invention is used to regulate the output voltage of an alternating current generator which is connected with a bridge rectifier that is used to supply the electrical loads on a motor vehicle including charging the battery. The field of the generator is supplied with current by a plurality of auxiliary diodes through a transistor voltage regulator operating in a switching mode. The voltage regulator includes a control transistor connected with the base of the output transistor of the regulator which is operative to block base drive to the output transistor whenever the voltage sensing circuit of the voltage regulator is disconnected from a circuit connecting the bridge rectifier and the battery. The system also includes an arrangement for regulating the output voltage of the generator at a value higher than the desired regulated value whenever the bridge rectifier becomes disconnected from a conductor which feeds the battery and other electrical loads on a motor vehicle.

This application is an improvement of the electrical system disclosed and claimed in U.S. patent application Ser. No. 668,836, filed on Sept. 19, 1967, and now Pat. No. 3,469,168 and assigned to the assignee of this invention.

This invention relates to a voltage regulating system of regulating the output voltage of a direct current power supply that is utilized to supply the electrical loads on a motor vehicle including charging the storage battery found on a motor vehicle.

In the system of this application and in the system of copending application Ser. No. 668,836 a transistor voltage regulator is provided which has an output transistor and an input circuit and the output transistor is operated in a switching mode and is connected in series with the field of the generator. The field circuit is supplied with current by three auxiliary diodes which, together with three diodes of the main power bridge rectifier, provide direct current to the field winding. The input or voltage sensing circuit of the voltage regulator is connected across the battery so as to respond to battery charging voltage and the battery and bridge rectifier are permanently connected by a power supply cable.

The advantage of the system that has just been described is that the field of the generator is only energized when the generator is developing an output voltage which eliminates the need for relays or other devices for disconnecting the field circuit of the generator from the power supply circuit when the system is at rest.

As pointed out in the above-mentioned copending patent application Ser. No. 668,836 it is possible during servicing of the electrical system, or due to other malfunctions, to inadvertently disconnect either the voltage sensing circuit of the regulator from the circuit connecting the bridge rectifier and the battery or to disconnect one of the power supply terminals of the bridge rectifier from the power supply lead. If the negative terminal of the bridge rectifier becomes disconnected the field winding is deenergized but if the positive terminal of the bridge rectifier becomes disconnected or if the voltage sensing circuit becomes disconnected the output transistor of the voltage regulator is continuously biased conductive which, without the voltage protection system of the copending application, would result in an uncontrolled high voltage which would destroy certain electrical components of the system.

It has been discovered that the electrical system is affected in different manners by the two different malfunctions that have been described. Thus, if only the voltage sensing circuit of the regulator becomes disconnected from the circuit connecting the bridge rectifier and the battery the bridge rectifier still supplies current to the electrical loads and the battery and even though this voltage is limited, for example, to 19 to 25 volts in a 12 volt system by the voltage protection system, this voltage can cause battery failure and has a detrimental effect on the electrical components of the vehicle electrical system.

On the other hand should the power supply conductor become disconnected from the bridge rectifier the system voltage rises but since the power supply conductor is now disconnected from the bridge rectifier and generator it will not feed the electrical loads on the motor vehicle so as to adversely affect these loads including the battery. The voltage developed under this condition of operation by the auxiliary diodes and a part of the bridge rectifier is not sufficient to adversely affect the voltage regulator.

It accordingly is one of the objects of this invention to provide a voltage regulating system which will reduce the output voltage of the generator substantially to zero whenever the input circuit of the voltage regulator becomes disconnected from the circuit connecting the diode-rectified generator and the battery. In carrying this object forward a switching device is connected in the base circuit of the output transistor and this switching device is utilized to prevent base drive to the output transistor of the voltage regulator whenever the voltage sensing lead of the regulator becomes disconnected from the battery.

Another object of this invention is to provide a voltage regulating system where the collector-emitter circuit of a control transistor is connected in series with the base-emitter circuit of the output transistor of the voltage regulator and a system where this control transistor is connected with the voltage sensing lead of the voltage regulator such that when the voltage sensing lead is connected to the battery the control transistor is biased conductive to provide a path for base current for the field controlling output transistor of the voltage regulator.

Still another object of this invention is to provide a voltage protection system for an electrical system that includes a diode-rectified alternating current generator and a plurality of auxiliary diodes for feeding the field circuit of the generator and where the system deenergizes the field when the voltage sensing lead of the regulator becomes disconnected from the battery and where the system is regulated at a voltage higher than the desired regulated voltage when the battery charging power supply lead becomes disconnected from the bridge rectifier.

Another object of this invention is to provide a voltage protection system for a transistor voltage regulator where the components of the system are formed as a single monolithic chip.

Still another object of this invention is to provide a voltage regulating system for a generator battery charging system including a driver transistor and an output transistor and a switching control transistor connected between the driver and output transistors which responds to battery voltage and where the control transistor develops a voltage drop which ensures a nonconductive condition of the output transistor when the driver transistor is biased conductive.

In the drawings:

FIG. 1 is a schematic circuit diagram of a generator voltage regulating system made in accordance with this invention;

FIG. 2 is a schematic circuit diagram of a monolithic chip which forms a part of the electrical system shown in FIG. 1;

Figure 3:
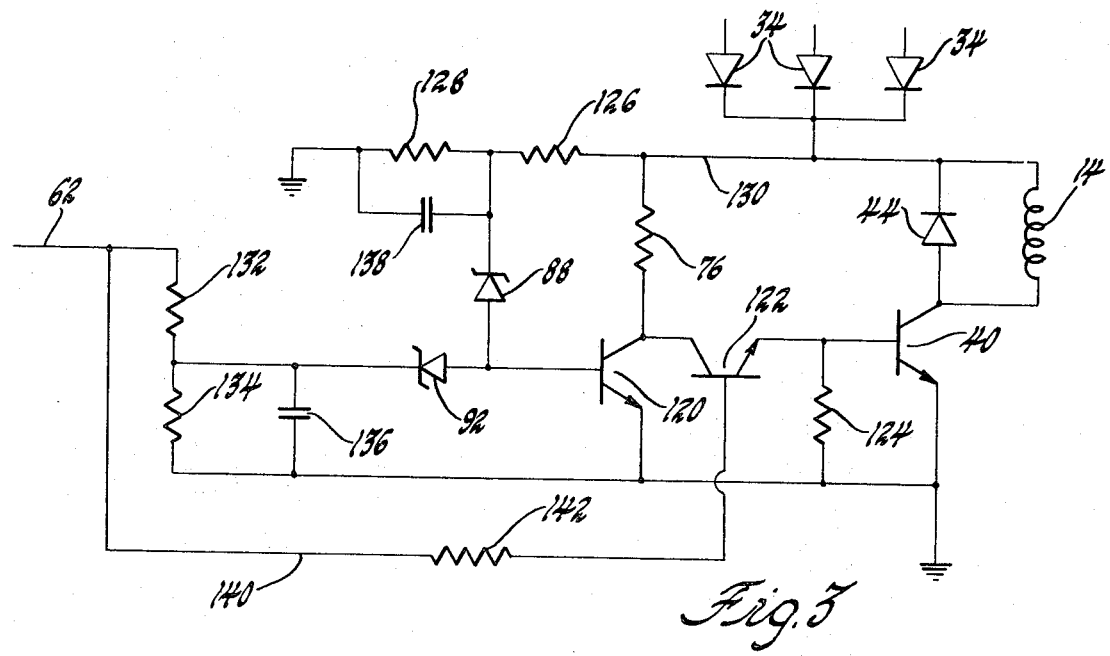
FIG. 3 is a modified voltage protection circuit which may be utilized in place of certain components in the system illustrated in FIG. 1.

Referring now to the drawings, and more particularly to FIG. 1, an electrical power supply system for a motor vehicle is illustrated. This power supply system includes an alternating current generator generally designated by reference numeral 10 which has a three phase Y-connected output winding 12 and a field winding 14. The polyphase winding 12 is connected with the AC input terminals 15, 16 and 18 of three phase full-wave bridge rectifier generally designated by reference numeral 20. The diodes that make up the bridge rectifier are silicon diodes and it is seen that the bridge rectifier has a positive direct current output terminal 22 and a negative output terminal 24 which is grounded.

The positive direct current output terminal 22 is connected with the positive terminal of a storage battery 26 by a power supply conductor 28. The power supply conductor 28 supplies charging current to the battery 26 when the generator 10 is being driven by the internal combustion engine of a motor vehicle (not shown). When the engine is not being driven the bridge rectifier 20 prevents the battery from discharging into the output winding of the generator.

The conductor 28 feeds various electrical loads on a motor vehicle which have been designated in their entirety by reference numeral 30. When switch 32 is closed the electrical load 30 is energized between conductor 28 and ground and when the generator is not charging the battery the battery can supply these electrical loads. The resistor 30 is intended to indicate various electrical loads including lights, radio and so forth and it will be appreciated by those skilled in the art that a number of switches will be required to individually feed the electrical loads for the vehicle.

The electrical system of this invention includes three auxiliary diodes 34 which are preferably silicon diodes and which have their cathodes commonly connected to a junction 36. The anodes of diodes 34 are connected respectively with the AC input terminals of the bridge rectifier 20 and are therefore connected respectively with the phase windings of the polyphase winding 12. When the generator is developing an output voltage the diodes 34 together with the grounded diodes of the bridge rectifier 20 form a three phase full-wave bridge rectifier which applies a direct current potential between junction 36 and ground. As will become more readily apparent hereinafter the diodes 34 operate as a device for connecting or disconnecting the field 14 to the electrical system. The direct current terminals 36 and 24 may be termed direct current field energizing terminals since they feed the field winding 14.

The field winding 14 of the generator has one end thereof connected to a conductor 38 and has its opposite end connected to the collector of a power output transistor 40 which forms a semiconductor switching device and the output stage of a transistor voltage regulator. The conductor 38 is connected with junction 36 by a conductor 42 and a field discharge diode 44 is connected across the field winding 14. The emitter of transistor 40 is connected to a conductor 46 and this conductor is connected to ground through a small resistor 48 of approximately .03 ohm. When transistor 40 is conductive in its collector-emitter circuit the field winding 14 will be energized with direct current through a circuit that can be traced from junction 36, through conductor 42, through field winding 14, through the collector-emitter circuit of transistor 40, and then through resistor 48 to the grounded junction 24 of the bridge rectifier 20. The transistor 40 is operated in a switching mode and when it turns off the self-induced current developed in field winding 14 flows through the field discharge diode 44.

The base of the output transistor 40 is connected with a conductor 49. A thermistor 50, having a negative temperature coefficient of resistance, is connected across the base and emitter electrodes of transistor 40. A control transistor switching device, which takes the form of a Darlington amplifier, generally designated by reference numeral 52 and comprised of NPN transistors 54 and 56 is connected in series with the conductor 49 and a junction 58. The Darlington amplifier 52 is a part of the voltage regulator and controls the conduction of the output transistor 40. To this end the base of transistor 56, which forms a part of the Darlington amplifier, is connected with a conductor 60 through a current limiting resistor 61. The conductor 60 is connected with conductor 62 at junction 64. The conductor 62 is connected to the conductor 28 at junction 66 which forms the voltage sensing terminal for the voltage regulating system of this invention. It can be seen that as long as the base of transistor 56 is connected with junction 66 the Darlington amplifier 52 will be forward biased to electrically connect the junction 58 and the base of transistor 40. On the other hand, should the voltage sensing lead 62 become disconnected from junction 66 the Darlington amplifier 52 will have no forward bias and it therefore will open the circuit between junction 58 and the base of transistor 40.

The voltage regulator of this invention includes a driver transistor switching device which takes the form of another Darlington amplifier generally designated by reference numeral 68 and comprised of NPN transistors 70 and 72. The collectors of transistors 70 and 72 are connected together by conductor 74. The emitter of transistor 70 is connected to conductor 46. The junction 58, which is connected with the collectors of transistors 70 and 72, is connected to conductor 38 by a resistor 76. A voltage divider comprised of resistors 78 and 80 is connected between conductor 74 and conductor 38. The junction 82 of the resistors 78 and 80 is connected to one side of a grounded capacitor 84 and to one side of a resistor 86. A Zener diode 88 is connected between resistor 86 and a junction 90 that is connected with the base of transistor 72. A second Zener diode 92 is connected between junction 90 and series connected resistors 94 and 96.

A filter capacitor 98 is connected between the junction of resistors 94 and 96 and the conductor 46.

The voltage regulator of this invention has a voltage sensing circuit which takes the form of a voltage divider generally designated by reference numeral 100. The voltage divider 100 is comprised of resistors 102, 104, 106, junction 107 and a thermistor 108 connected in parallel with resistor 102. The thermistor 108 provides temperature compensation for the system. The voltage divider 100 is connected across conductor 28 and ground and therefore senses the voltage appearing between conductor 28 and ground. The voltage sensing lead 62 is connected as close as possible to the battery 26 in order that the voltage divider 100 will respond to the voltage applied to the battery 26. This voltage will differ from the voltage at junction 22 by the amount of voltage drop in cable conductor 28 when the generator is charging the battery and supplying the electrical loads 30.

A circuit is provided for initially energizing the field 14 of the generator from the battery 26. This circuit includes a manually operable switch 110, a signal lamp 112 connected in parallel with resistor 114 and conductors 116 and 118. When the switch 110 is closed the field 14 of the generator will be energized from the positive side of battery 26 through conductor 116, through switch 110, through the parellel connected signal lamp 112 and resistor 114, through conductor 118, through conductor 38, through field winding 14, through the collector-emitter circuit of transistor 40 and through resistor 48 to ground. The signal lamp 112 provides a means for indicating whether or not the generator is charging the battery and will not be used where the system includes an ammeter.

The operation of the FIG. 1 embodiment of this invention will now be described.

When the operator of a motor vehicle closes the switch 110 the field 14 of the generator will be energized from battery 26 to provide initial excitation for the field winding 14. When the engine of the motor vehicle starts and drives the generator the generator output voltage rises and is maintained at a desired regulated value by the voltage regulator, for example, 14 volts in a 12 volt system. When the generator comes up to voltage the signal lamp 112 is extinguished since the voltage of conductor 38 will be approximately the same as the voltage of conductor 28.

As the output voltage appearing between junction 66 and ground rises above a predetermined desired regulated value the voltage between junction 107 and conductor 46 reaches a value where it breaks down the Zener diode 92 and the series connected base-emitter junctions of transistors 72 and 70. When this happens the Darlington amplifier 68 is biased conductive and as a result of this the potential of junction 58 approaches that of conductor 46. At this time the Darlington amplifier 52 is biased conductive by the potential of junction 66 and the potential of the base of the output transistor 40 is therefore the potential of junction 58 less the voltage drop across the Darlington amplifier 52 or in other words across the collector-emitter circuit of transistor 54. This voltage is not sufficient to forward bias transistor 40 and it therefore turns off in its collector-emitter circuit. When transistor 40 turns off the field current is switched off reducing the output of the generator.

When the output voltage of the generator drops below the desired regulated value the potential between junction 107 and conductor 46 is lowered to the point where transistors 72 and 70 switch from a conductive condition to a nonconductive condition. The potential of junction 58 now rises since there no longer is a conductive path through the Darlington amplifier 68 to conductor 46 and this potential between junction 58 and conductor 46 now biases the transistor 40 conductive. As a result of this the field current increases to raise the output voltage of the generator.

The transistor 40 switches on and off during operation of the voltage regulator that has been described to maintain a desired output voltage for the generator.

It will be appreciated that field current for the field winding 14 is supplied by the diodes 34 and the grounded diodes of the bridge rectifier 20. This arrangement is provided so that the field winding 14 will be energized by a static circuit, that is, a circuit that does not utilize switch contacts whenever the generator is developing an output voltage. It will be observed that the battery 26 cannot discharge through the field of the generator when switch 110 is opened but the field is nevertheless supplied with current by diodes 34 when the system is in operation. The voltage divider 100 is permanently connected across the battery but is comprised of resistors of relatively high resistance and for this reason drain on the battery is negligible when the system is shut down.

Since the field winding 14 of the generator is connected with auxiliary diodes 34 and the lower diodes of bridge rectifier 20 the field will also be energized whenever the generator is developing a voltage and when transistor 40 is biased conductive. It will also be observed that the regulating system is of the type that where the voltage divider 100 is sensing a low voltage the transistor 40 is biased conductive. If it were not for one of the features of this invention, should conductor 62 become disconnected from junction 66, the voltage divider 100 would sense zero voltage with the result that transistor 40 would be biased fully conductive by the voltage developed by diodes 34. When this condition occurs field current is continuously supplied to the field winding 14 with the result that the generator output voltage would go out of control and to an abnormally high value were it not for the protection features of this invention which are to be described.

Another situation where the generator voltage may go out of control is where the cable 28 becomes inadvertently disconnected from the power output terminal 22 of the bridge rectifier 20. In this case, the voltage divider 100 senses battery voltage but since this voltage is less than the desired regulated voltage, for example, 14 volts in a 12 volt system, the transistor 40 again is continuously biased conductive with the resultant abnormal high voltage.

In the above-mentioned copending patent application Ser. No. 668,836, filed on Sept. 19, 1967, an over voltage protection system is disclosed and claimed which will regulate the output voltage of the generating system should the lead 62 become disconnected from junction 66 or the power supply lead 28 become disconnected from junction 22.

Although both of the above-mentioned malfunctions result in an abnormally high voltage which can be regulated by the system of the above-mentioned copending application, there is a difference in how these two malfunctions affect the regulating system. In the case where conductor 62 becomes disconnected from junction 66, the electrical loads of the motor vehicle, including the battery 26, are still connected with conductor 28 with the result that even if the higher voltage is maintained at a higher regulated value, for example, 19 to 25 volts, the electrical loads of the vehicle may be damaged and the battery may also be damaged by a boiling of the battery electrolyte.

On the other hand, should the conductor 28 become disconnected from junction 22, the electrical system will regulate at the higher voltage range (19 to 25 volts) but now the electrical loads are no longer supplied by conductor 28 and this higher voltage will not destroy the regulating components of the voltage regulator.

In order to protect the system from the condition where conductor 62 becomes disconnected from junction 66 the Darlington amplifier 52 is provided which is connected between junction 58 and the base of transistor 40. If the conductor 62 should become disconnected from junction 66 the Darlington amplifier 52 has no bias current applied to it through resistor 61 so it therefore becomes nonconductive. This means that no base current can be supplied to transistor 40 and because of this the generator output voltage drops substantially to zero whenever conductor 62 becomes disconnected from junction 66. This protects the electrical loads and the battery 26 which are supplied from cable conductor 28.

In the event that cable conductor 28 becomes disconnected from junction 22 the regulating system will regulate at a higher regulated value, for example 19 to 25 volts in a 12-volt system. When conductor 28 is disconnected from junction 22 the voltage divider senses only battery voltage which tends to forward bias transistor 40. The output voltage of the generator now rises to the higher regulated value and the diodes 34, together with the lower diodes of bridge rectifier 20, apply a higher voltage between conductor 38 and ground. As the voltage between conductor 38 and ground begins to rise the voltage drop across resistor 76 increases. Since the resistors 78 and 80 are in parallel with resistor 76 the voltage of junction 82 will also increase. When the voltage between conductor 38 and ground corresponds to a system voltage, of for example 19 to 25 volts, the voltage between junction 82 and conductor 46 will be sufficient to break down the Zener diode 88 and the base-emitter junctions of transistors 72 and 70.

3,539,864

7

This causes the Darlington amplifier 68 to turn on resulting in the turning off of the output transistor 40. This reduces the generator output voltage to a point where transistors 72 and 70 are driven nonconductive which then results in biasing the transistor 40 conductive. The over voltage protection circuit which includes Zener diode 88 therefore regulates the output voltage of the generator at the higher regulated value in the 19 to 25 volt range whenever conductor 28 becomes disconnected from junction 22. This higher voltage developed by diodes 34 and the grounded diodes of bridge rectifier 20 is not sufficient to have any detrimental effect on the components of the voltage regulator connected with conductor 38 and ground.

It will be observed that the over voltage protection circuit, including Zener diode 88, is a modification of the over voltage protection disclosed and claimed in the above-mentioned copending patent application Ser. No. 668,836 and it will also be observed that the system of FIG. 1, which utilizes the Darlington amplifier 52 provides additional protection not utilized in the above-mentioned copending application.

It should be pointed out that when the Darlington amplifier 52 is biased conductive the voltage drop across the collector-emitter circuit is utilized to maintain transistor 40 biased nonconductive when transistor 70 is biased conductive. Thus, there is some voltage drop across transistor 70 when it is biased conductive and were it not for the collector-emitter circuit of transistor 54 this voltage could forward bias transistor 40 when it is desired that this transistor be biased nonconductive. The voltage drop across transistor 70, when it is conductive, is of the same magnitude as the voltage drop across conductive transistor 54 and the net result of this is that the potential of the base and emitter electrodes of transistor 40 is of a value which will not forward bias this transistor when it is supposed to be biased nonconductive. The thermistor 50 aids in maintaining transistor 40 nonconductive when transistor 70 is biased conductive.

Referring now more particularly to FIG. 2 a circuit diagram is illustrated for an integrated circuit where the Darlington amplifiers 52 and 68 and the Zener diodes 88 and 92 are formed as a single monolithic chip. It is preferred that the regulating system be manufactured by this technique and it will be appreciated from an inspection of FIG. 2 that a common collector connection which is formed of N-type material is utilized for this chip. In FIG. 2 the same reference numerals have been used as were used in FIG. 1 to designate identical parts in each figure. It will be appreciated from an inspection of FIG. 2 that the Zener diode 88 is formed from the emitter-base junction of an NPN transistor whereas the Zener diode 92 is likewise formed by the emitter-base junction of an NPN transistor. All of the components have a common collector connection as is clearly apparent from an inspection of FIG. 2.

Referring now to FIG. 3 a modified voltage protection circuit is illustrated which can be used in the motor vehicle electrical system of FIG. 1. Insofar as the components are identical the same reference numerals have been used in FIGS. 1 and 3 to identify the same parts in each figure. It will be observed that in the FIG. 3 embodiment an NPN transistor 120 is utilized rather than the Darlington amplifier 68. In FIG. 3 a single NPN transistor 122 is utilized rather than the Darlington amplifier 52 of FIG. 1. A resistor 124 is connected across the base-emitter circuit of output transistor 40 rather than the thermistor 50 of FIG. 1. The over voltage protection circuit in FIG. 3 is the same as that utilized in copending patent application Ser. No. 668,836 and comprises resistors 126 and 128 connected between conductor 130 and ground. In the system of FIG. 3 the voltage divider for sensing the output voltage of the system includes resistors 132 and 134 the resistor 134 being shunted by capacitor 136. The resistor 128 is shunted by filter capacitor 138. In the FIG. 3 embodiment the base of transistor 122 is connected to the battery sensing lead 62 through a conductor 140 and resistor 142.

8

In the embodiment of FIG. 3 the transistor 122 will disconnect driver transistor 120 and output transistor 40 in the event that the lead 62 becomes disconnected from the battery to therefore maintain a zero output voltage condition for the generator. In the FIG. 3 embodiment the Zener diode 88 performs the same function as Zener diode 88 shown in FIG. 1 and this Zener diode will control the conduction of transistors 120 and 40 to regulate the output voltage in the higher regulated value (19 to 25 volts) should the conductor 28 become disconnected from power supply terminal 22.

Figure 4:
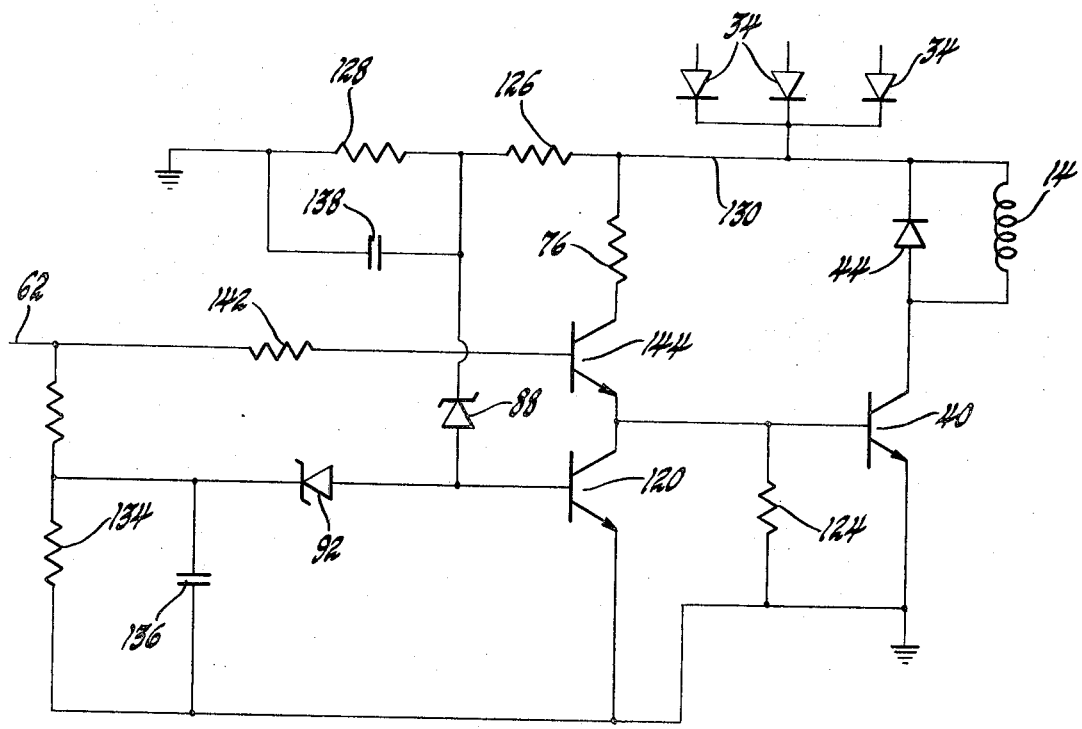
FIG. 4 is still another modified version of a voltage protection circuit which may be utilized in place of certain of the components illustrated in FIG. 1.

Referring now to FIG. 4, an embodiment of the invention is illustrated which is identical with the FIG. 3 embodiment with the exception that an NPN transistor 144 is now connected between conductor 130 and the base of output transistor 40. It will be appreciated that transistor 144 performs the same function as transistor 122 in the FIG. 3 embodiment and the same function as the Darlington amplifier 52 in the FIG. 1 embodiment of this invention. The base of transistor 144 is connected to the battery sensing lead 62 through a resistor 142 and when this lead is disconnected from junction 66 the transistor 144 is biased nonconductive to prevent base drive to the transistor 40. On the other hand as long as lead 62 is connected with junction 66 to sense either system or battery voltage the transistor 144 is biased conductive to provide a path for base current for transistor 40.

It will be appreciated that in the FIG. 3 and FIG. 4 embodiments the driver transistor switches on and off in accordance with the bias voltage applied to it and that the output transistor assumes an opposite state. In other words, when driver transistor is biased conductive the output transistor is biased nonconductive and vice versa. It will be appreciated that the driver transistor 120 is the equivalent of Darlington amplifier 68 and such a Darlington amplifier can be utilized in place of transistor 120.

In the FIG. 4 embodiment of this invention a forward biased PN junction diode can be connected between the collector of transistor 120 and the base of transistor 40 to provide a voltage drop to maintain the transistor 40 biased nonconductive whenever transistor 120 is biased conductive. This diode will perform the same function as the collector-emitter circuit of transistor 54 in the FIG. 1 embodiment of the invention.

The preferred embodiment of the invention is the FIG. 1 system which lends itself to fabrication as a monolithic chip as illustrated in FIG. 2 but it will be appreciated by those skilled in the art that various combinations of transistors and voltage protection systems can be utilized to practice this invention as long as some type of switching device, such as the Darlington amplifier 52 in FIG. 1 or the transistors 122 and 144 in FIGS. 3 and 4, are utilized to block base current to the output transistor 40 whenever the lead 62 becomes disconnected from conductor 28.

What is claimed is:

1. An electrical system comprising, an alternating current generator having an output winding and a field winding, a power bridge rectifier having direct current output terminals, a battery, means connecting said battery directly across said output terminals of said bridge rectifier whereby said bridge rectifier supplies charging current to said battery, a plurality of auxiliary diodes connected with said output winding, said auxiliary diodes being connected with a third direct current output terminal, said third direct current output terminal and one direct current output terminal of said power bridge rectifier forming field energizing terminals, a voltage regulator including a semiconductor switching device having a pair of current carrying terminals and a control terminal, means connecting said field winding and the current carrying terminals of said semiconductor switching device in series across said field energizing terminals, a voltage sensing circuit for said voltage regulator, means connecting said voltage sensing circuit across said battery including a voltage sensing lead connected with a first side of said battery, means connecting said voltage sensing circuit and the control terminal of said semiconductor switching device to control the conduction of said device as a function of the output voltage of said generator, a switching device connected in series between one of said field energizing terminals and said control terminal of said semiconductor switching device, said switching device having a pair of control terminals one of which is connected to said voltage sensing lead and the other of which is connected to a second side of said battery, said switching device biased conductive when said voltage sensing lead is connected to said first side of said battery and biased nonconductive to interrupt current flow to the control terminal semiconductor switching device when said voltage sensing lead is disconnected from said first side of said battery.

2. An electrical system comprising, an alternating current generator having an output winding and a field winding, a bridge rectifier connected with said output winding having direct current output terminals, a battery, power supply conductors connecting said battery across the output terminals of said bridge rectifier, a plurality of auxiliary diodes connected with said output winding, said auxiliary diodes having a common connection forming a first field energizing terminal, a second field energizing terminal provided by one of the direct output terminals of said bridge rectifier, a power output transistor, means connecting said field winding and said power output transistor in series across said field energizing terminals, a voltage sensing circuit for said voltage regulator connected across the direct current output terminals of said bridge rectifier and including a voltage sensing lead connected with one of said power supply conductors, means connected with said voltage sensing circuit and with said power output transistor for controlling the conduction of said power output transistor as a function of the voltage sensed by said voltage sensing circuit, a second transistor switching device having a collector, emitter and base, means connecting the collector and emitter of said second transistor switching device between the base of said power output transistor and one of said field energizing terminals and means connecting the base of said second transistor switching device with said voltage sensing lead, said second transistor switching device being biased conductive when said voltage sensing lead is connected with said one power supply conductor and biased nonconductive when said voltage sensing lead is disconnected from said one power supply conductor.

3. The electrical system according to claim 2 where the second transistor switching device is comprised of a pair of NPN transistors having their collectors connected together and the emitter of one of the transistors connected to the base of the other transistor.

4. An electrical system comprising, an alternating current generator having an output winding and a field winding, a bridge rectifier network having AC input terminals connected with said output winding and direct current output terminals, direct current power supply conductors connected with said direct current output terminals of said bridge rectifier, a battery connected to said power supply conductors, a plurality of auxiliary diodes connected with said output winding, said auxiliary diodes having a common connection providing one direct current field energizing terminal, one of the direct current output terminals of said bridge rectifier forming another field energizing terminal, a voltage regulator including a power output transistor, means connecting said power output transistor and said field winding in series across said field energizing terminals, a driver transistor switching device, a circuit connected across said field energizing terminals including a resistor and said driver transistor switching device, said last named circuit including a junction connected between said driver transistor switching device and said resistor, a control transistor switching device, means connecting the collector and emitter of said control transistor switching device in series between said junction and the base of said power output transistor, a voltage sensing circuit for said voltage regulator connected across said battery and including a voltage sensing lead connected with one of said power supply conductors, means coupling the base of said control transistor switching device with said voltage sensing lead whereby said control transistor switching device is biased conductive when said voltage sensing lead is connected with said one of said power supply conductors, a first Zener diode connected between said driver transistor switching device and said voltage sensing circuit, said first Zener diode responding to a desired regulated output voltage for said generator, and a second Zener diode connected between said driver transistor switching device and one of said field energizing terminals, said second Zener diode providing voltage regulation for said system in the event that the output voltage of said generator rises above the desired regulated value provided by said first Zener diode by a predetermined amount.

5. The electrical system according to claim 4 where said driver transistor switching device and said control transistor switching device are both provided by pairs of NPN transistors having common collector connections and direct base to emitter connections.

6. An electrical system comprising, an alternating current generator having a polyphase output winding and a field winding, a polyphase bridge rectifier having AC input terminals and direct current output terminals, power supply conductors connected with the direct current output terminals of said bridge rectifier, a battery connected across said power supply conductors, a plurality of auxiliary diodes connected with said polyphase output winding having a common direct current output terminal forming a first field energizing terminal, one of said direct current output terminals of said bridge rectifier forming another field energizing terminal, a power output transistor having an emitter, base and collector, means connecting the collector and emitter of said output transistor and said field winding in series across said field energizing terminals whereby said auxiliary diodes supply current to said field winding when said output transistor is biased conductive, a voltage sensing circuit for said voltage regulator including a voltage divider connected across said power supply conductors, said voltage sensing circuit including a voltage sensing lead connected to one side of said battery, a driver transistor switching means including at least one transistor having a collector and emitter, a resistor, means connecting said resistor and the collector and emitter of said driver transistor switching means across said field energizing terminals, a junction connected between said driver transistor switching means and said resistor, a control transistor switching means including at least one transistor having a collector and emitter, means connecting the collector and emitter of said control transistor switching means between said junction and the base of said power output transistor, means coupling the base of said control transistor switching means with said voltage sensing lead whereby said control transistor switching means is biased conductive when said voltage sensing lead is connected to said one side of said battery and said bridge rectifier, and a Zener diode connected between said voltage divider of said voltage sensing circuit and the base of said driver transistor switching means for controlling the switching of said driver transistor switching means and output transistor as a function of the output voltage of said generator.

7. The electrical system according to claim 6 wherein a second Zener diode is provided connected between the base of the driver transistor switching means and one of said field energizing terminals, said second Zener diode responding to a voltage which corresponds to an output voltage of said generator that is higher than the desired regulated value to be maintained by said first Zener diode.

8. An electrical system comprising, an alternating current generator having an output winding and a field winding, a bridge rectifier connected with said output winding having direct current output terminals, power supply conductors connected with said direct current output terminals, a transistor voltage regulator including a power output transistor switching device having a collector and emitter, a plurality of auxiliary diodes connected with said output winding of said generator, said auxiliary diodes having a common connection providing a first field energizing terminal, one of the direct current output terminals of said bridge rectifier forming a second field energizing terminal, means connecting said field winding and the collector and emitter of said power output transistor switching device in series across said field energizing terminals, a driver transistor switching device having a collector, emitter and base, a first resistor, means connecting said first resistor and the collector and emitter of said driver transistor switching device in series across said field energizing terminals, a junction connected intermediate said first resistor and the collector of said driver transistor switching device, means connecting said junction and the base of said power output transistor switching device, voltage sensing means for said voltage regulator connected across said power supply conductors, a first Zener diode connected between said voltage sensing circuit and the base of said driver transistor switching device, second and third resistors connected in parallel with said first resistor between one of said field energizing terminals and the collector of said driver transistor switching device, and a second Zener diode connected between a junction of said second and third resistors and the base of said driver transistor switching device, said first Zener diode controlling said voltage regulator to provide a desired regulated output voltage, said second Zener diode providing voltage regulation for said system when the voltage appearing between said field energizing terminals corresponds to a system voltage which is higher than said desired regulated voltage.

9. The electrical system according to claim 8 where a fourth resistor is connected in series with said second Zener diode between said second Zener diode and the junction of said second and third resistors and where a capacitor is connected between the junction of said second and third resistors and one of the direct current output terminals of said bridge rectifier.

10. An electrical system comprising, an alternating current generator having an output winding and a field winding, a power bridge rectifier having first and second direct current output terminals, a battery, means connecting said battery directly across said output terminals of said rectifier whereby said bridge rectifier supplies charging current to said battery, a plurality of auxiliary diodes connected with said output winding, said auxiliary diodes being connected with a third direct current output terminal, said third direct current output terminal and said first direct current output terminal of said bridge rectifier forming field energizing terminals, a power output transistor, means connecting said field winding and the collector and emitter of said output transistor in series across said field energizing terminals, a driver transistor having a collector, emitter and base, a control transistor having a collector, emitter and base, means connecting the collector and emitter of said driver transistor across the base and emitter of said output transistor, means connecting the collector and emitter of said control transistor beween said third direct current output terminal and the base of said output transistor, the collector-emitter circuit of said control transistor connected in series with the collector-emitter circuit of said driver transistor, a voltage divider, means connecting said voltage divider across said battery including a voltage sensing lead connected to one side of said battery, a Zener diode connected between said voltage divider and the base of said driver transistor, and means connecting the base of said control transistor with said voltage sensing lead whereby said control transistor is biased conductive to connect said third direct current output terminal with said driver transistor and with the base of said output transistor when said voltage sensing lead is connected to said one side of said battery, said control transistor biased nonconductive to disconnect said third direct current output terminal and said driver and output transistors when said voltage sensing lead is disconnected from said one side of said battery.

References Cited
UNITED STATES PATENTS 3,373,341  3/1968  Wattson.
3,467,854  9/1969  Harland et al. _____ 322—28

ORIS L. RADER, Primary Examiner

H. HUBERFELD, Assistant Examiner

U.S. Cl. X.R.

317—20, 31; 322—28, 36, 60, 73